(12) United States Patent
Takeuchi et al.

(10) Patent No.: US 11,566,154 B2
(45) Date of Patent: Jan. 31, 2023

(54) JOINED BODY

(71) Applicant: KABUSHIKI KAISHA TOYOTA CHUO KENKYUSHO, Nagakute (JP)

(72) Inventors: Hisato Takeuchi, Nagakute (JP); Jumpei Kawada, Nagakute (JP); Azusa Tsukigase, Nagakute (JP); Natsu Takagi, Nagakute (JP); Takuya Mitsuoka, Nagakute (JP); Kazuhiko Umemoto, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 867 days.

(21) Appl. No.: 16/287,507

(22) Filed: Feb. 27, 2019

(65) Prior Publication Data

US 2019/0276720 A1    Sep. 12, 2019

(30) Foreign Application Priority Data

Mar. 8, 2018   (JP) .............................. JP2018-041637

(51) Int. Cl.
 *C09J 177/04*   (2006.01)
 *C08J 5/12*   (2006.01)
 (Continued)

(52) U.S. Cl.
 CPC ............. *C09J 177/04* (2013.01); *C08J 5/128* (2013.01); *C09J 123/12* (2013.01); *C09J 177/02* (2013.01);
 (Continued)

(58) Field of Classification Search
 None
 See application file for complete search history.

(56) References Cited

U.S. PATENT DOCUMENTS

| 2002/0177672 | A1* | 11/2002 | Matsuoka | ............... C08L 67/00 |
| | | | | 525/416 |
| 2004/0081778 | A1* | 4/2004 | Pynenburg | ............... H01G 9/08 |
| | | | | 428/34.1 |

(Continued)

FOREIGN PATENT DOCUMENTS

| JP | H08-106885 A | 4/1996 |
| JP | 2013-147645 A | 8/2013 |

(Continued)

OTHER PUBLICATIONS

Doux—WO 2012-076763 A1—MT—2-phase polymer blend of polyamide & polyolefin—metal composite—2012 (Year: 2012).*

(Continued)

*Primary Examiner* — John Vincent Lawler
(74) *Attorney, Agent, or Firm* — Oliff PLC

(57) ABSTRACT

Provided is a joined body comprising a first joined member, a second joined member, and a joining layer that joins the first joined member and the second joined member, wherein the first joined member and the second joined member are each independently one selected from the group consisting of a metal member, a polyamide resin member, and a polyolefin resin member, and the joining layer is a layer formed of a resin composition having a co-continuous phase including a continuous phase A farmed of the polyamide resin and a continuous phase B formed of the polyolefin resin and has a dispersed domain a distributed in the continuous phase A, a finely dispersed subdomain a' distributed in the dispersed domain a, a dispersed domain b distributed in the continuous phase B, and a finely dispersed subdomain b' distributed in the dispersed domain b.

11 Claims, 2 Drawing Sheets

(51) Int. Cl.
  *C09J 123/12* (2006.01)
  *C09J 177/02* (2006.01)

(52) U.S. Cl.
  CPC ........ *C08J 2323/12* (2013.01); *C08J 2323/26* (2013.01); *C08J 2377/04* (2013.01); *C08J 2423/12* (2013.01)

(56) References Cited

U.S. PATENT DOCUMENTS

| | | |
|---|---|---|
| 2014/0364569 A1 | 12/2014 | Kito et al. |
| 2015/0031837 A1* | 1/2015 | Favis .................. C08L 23/12 264/140 |
| 2015/0218373 A1* | 8/2015 | Kawada ................ C08L 23/00 525/179 |
| 2020/0032018 A1* | 1/2020 | Kito .................... C08L 77/02 |

FOREIGN PATENT DOCUMENTS

| | | | |
|---|---|---|---|
| JP | 2013-147646 A | 8/2013 | |
| JP | 2013-147647 A | 8/2013 | |
| JP | 2013-147648 A | 8/2013 | |
| JP | 2014-25060 A | 2/2014 | |
| JP | 2016-27178 A | 2/2016 | |
| JP | 2016-166365 A | 9/2016 | |
| WO | WO-2012076763 A1 * | 6/2012 | ........... B32B 15/085 |
| WO | 2018/168720 A1 | 9/2018 | |

OTHER PUBLICATIONS

Ma—PA-LLDPE composites—hot melt adhesive—J.Adhes.Sci. Tech.—2016 (Year: 2016).*

Jul. 14, 2020 Japanese Office Action issued in Japanese Patent Application No. 2018-041637.

* cited by examiner

JOINED BODY

BACKGROUND OF THE INVENTION

Field of the Invention

The present invention relates to a joined body, and more specifically to a joined body including at least one of a metal member, a polyamide resin member, and a polyolefin resin member as a joined member.

Related Background Art

Joined bodies in which metal members and/or resin members are joined such as metal-metal joined bodies, metal-resin joined bodies, and resin-resin joined bodies have been used in a wide range of industries from semiconductor devices and electronic instruments such as LEDs and thin batteries to exterior materials, interior materials, and structural materials for automobiles, rail cars, ships, aircraft, and the like and for furniture, buildings, and the like. The application of such joined bodies has been expanding.

As a method for joining metal members and/or resin members, besides mechanical joining methods using rivets, bolts, and the like and material joining methods using welding, brazing, and the like, chemical joining methods exemplified by adhesion using adhesives (including adhesive films) have been known. The adhesion has advantages that it allows joined members, which are to be joined, to be brought into more intimate contact with each other, and it is unlikely to cause deformation of joined members themselves. In particular, the adhesion is often utilized when joined members formed of different types of materials such as a metal member and a resin member are to be joined.

As adhesives for the adhesion, for example, hot-melt adhesives mainly containing ethylene-vinyl acetate copolymer (EVA), maleic anhydride-modified polypropylene, and the like, and acrylic adhesives have been utilized in general. However, the joining strength obtainable by these adhesives has not been sufficient yet. In addition, for example, when a metal member and a polyolefin resin member are to be joined using the acrylic adhesive, it is necessary to apply a primer to the polyolefin resin member because the adhesion between the acrylic adhesive and the polyolefin resin member is low.

In addition, various studies have been made for the purpose of improving the performance of the adhesives. For example, Japanese Unexamined Patent Application Publication No. Hei 8-106885 (Patent Literature 1) describes a thin battery which is a joined body in which a battery element interposed between a pair of terminal plates is sealed with a sealing material film at a peripheral portion of the terminal plates, and states that the sealing material film has a structure of at least three layers, including hot-melt polyolefin layers on opposite outer layer sides and an intermediate layer formed of polyamide and interposed between these hot-melt polyolefin layers.

Japanese Unexamined Patent Application Publication No. 2014-25060 (Patent Literature 2) describes a resin composition which is made by blending a first resin, a second resin not compatible with the first resin, and a modified elastomer having a reactive group capable of reacting with the first resin and which has a specific dispersed domain and a finely dispersed subdomain in a co-continuous phase including a continuous phase A formed of the first resin and a continuous phase B formed of the second resin. As the first resin and the second resin, a polyamide resin and a polyolefin resin are given, respectively. The resin composition described in Patent Literature 2 aims at improving the rigidity and the impact strength of a polymer alloy obtained by mixing resins of different types. As such resin compositions, for example, Japanese Unexamined Patent Application Publication No. 2013-147645 (Patent Literature 3), Japanese Unexamined Patent Application Publication No. 2013-147646 Patent Literature 4), Japanese Unexamined Patent Application Publication No. 2013-147647 (Patent Literature 5) and Japanese Unexamined Patent Application Publication No. 2013-147648 (Patent Literature 6), as well as Japanese Unexamined Patent Application Publication No. 2016-27178 (Patent Literature 7) and Japanese Unexamined Patent Application Publication No. 2016-166365 (Patent Literature 8) also describe a thermoplastic resin composition having a so-called sea-island structure containing a polyamide resin distributed in a polyolefin resin, and a thermoplastic resin composition having a so-called salami structure having a dispersed domain formed of a polyamide resin in a polyolefin resin and a finely dispersed subdomain distributed in the dispersed domain. These PTLs describe making the resin compositions as compacts for use in the application of components provided with rigidity and impact strength, and the like.

SUMMARY OF THE INVENTION

However, when conducted further studies on a joined body including at least one of a metal member, a polyamide resin member, and a polyolefin resin member as a joined member, the present inventors found that a conventional joined body, for example, a joined body including a film having polyolefin layers on opposite outer layer sides as a joining layer as described in Patent Literature 1 has difficulty in achieving a sufficient joining strength, particularly when a metal member is used as a joined member.

The present invention has been made in view of the problems of the above-described conventional joined bodies, and an object thereof is to provide a joined body including at least one of a metal member, a polyamide resin member, and a polyolefin resin member as joined members and being excellent in joining strength between these joined members.

The present inventors conducted earnest studies in order to achieve the above-described object, and consequently found that in a joined body including at least one of a metal member, a polyamide resin member, and a polyolefin resin member as joined members (a metal-metal joined body, a metal-resin (a polyamide resin or a polyolefin resin) joined body, a resin (a polyamide resin or a polyolefin resin)-resin (a polyamide resin or a polyolefin resin) joined body), using a resin composition having a specific co-continuous phase structure aiming at improving the rigidity and impact strength as a joining layer for joining these joined members surprisingly allows the resin composition to function as an excellent adhesive and to be capable of achieving a sufficiently high joining strength in any combination of the joined members and exhibiting an excellent joining performance. In particular, the present inventors found that using the resin composition as the joining layer enables an excellent joining strength even in a joined body of different types of materials, that is, the metal member and the polyamide resin member or the polyolefin resin member (the metal-resin), and completed the present invention.

Specifically, a joined body of the present invention is a joined body comprising: a first joined member; a second joined member; and a joining layer that joins the first joined member and the second joined member, wherein the first joined member and the second joined member are each independently one selected from the group consisting of a metal member, a polyamide resin member, and a polyolefin resin member, the joining layer is a layer formed of a resin composition containing a polyamide resin, a polyolefin resin, a modified elastomer having a reactive group capable of reacting with the polyamide resin, and a reaction product of the polyamide resin and the modified elastomer, the resin composition has a co-continuous phase including a continuous phase A formed of the polyamide resin and a continuous phase B formed of the polyolefin resin and has a dispersed domain a distributed in the continuous phase A, a finely dispersed subdomain a' distributed in the dispersed domain a, a dispersed domain b distributed in the continuous phase B, and a finely dispersed subdomain b' distributed in the dispersed domain b, the dispersed domain a is a dispersed domain formed of at least one selected from the group consisting of the polyolefin resin, and the reaction product of the polyamide resin and the modified elastomer, the dispersed domain b is a dispersed domain formed of at least one selected from the group consisting of the polyamide resin, and the reaction product of the polyamide resin and the modified elastomer, when the dispersed domain a is formed of the polyolefin resin, the finely dispersed subdomain a' is a finely dispersed subdomain formed of at least one selected from the group consisting of the polyamide resin, the modified elastomer, and the reaction product of the polyamide resin and the modified elastomer, when the dispersed domain a is formed of the reaction product of the polyamide resin and the modified elastomer, the finely dispersed subdomain a' is a finely dispersed subdomain formed of at least one selected from the group consisting of the polyamide resin, the polyolefin resin, and the modified elastomer, when the dispersed domain b is formed of the polyamide resin, the finely dispersed subdomain b' is a finely dispersed subdomain formed of at least one selected from the group consisting of the polyolefin resin, the modified elastomer, and the reaction product of the polyamide resin and the modified elastomer, and when the dispersed domain b is formed of the reaction product of the polyamide resin and the modified elastomer, the finely dispersed subdomain b' is a finely dispersed subdomain formed of at least one selected from the group consisting of the polyamide resin, the polyolefin resin, and the modified elastomer.

Preferably, in the joined body of the present invention, a metal constituting the metal member is at least one selected from the group consisting of aluminum, iron, copper, and titanium.

Preferably, in the joined body of the present invention, the first joined member is the metal member, and the second joined member is one selected from the group consisting of the polyamide resin member and the polyolefin resin member.

Further preferably, in the joined body of the present invention, the polyamide resin blended in the resin composition contains at least one selected from the group consisting of polyamide 11, polyamide 12, polyamide 1010, and polyamide 1012.

In addition, preferably, in the joined body of the present invention, the modified elastomer is a copolymer of ethylene or propylene and an α-olefin having 3 to 8 carbon atoms, the copolymer having an acid anhydride group as the reactive group.

Further preferably, in the joined body of the present invention, the resin composition is a resin composition in which the dispersed domain a includes a dispersed domain formed of the polyolefin resin and a dispersed domain formed of the reaction product of the polyamide resin and the modified elastomer, the dispersed domain b includes a dispersed domain formed of the reaction product of the polyamide resin and the modified elastomer, the finely dispersed subdomain a' includes a finely dispersed subdomain which is present in the dispersed domain a formed of the polyolefin resin and which is formed of the reaction product of the polyamide resin and the modified elastomer, and the finely dispersed subdomain b' includes a finely dispersed subdomain which is present in the dispersed domain b formed of the reaction product of the polyamide resin and the modified elastomer and which is formed of the modified elastomer.

Note that although the reason why the above-described object can be achieved by the configuration of the present invention is unclear, the present inventors surmise as described below.

Specifically, in the joined body of the present invention including the first joined member/the joining layer/the second joined member in this order, the polyamide resin and the polyolefin resin in the resin composition constituting the joining layer form the co-continuous phase having the above-described microstructure and the polyamide resin and the polyolefin resin appear homogeneously on the surface. Here, the polyamide resin adheres with the metal member (mainly a hydrogen bond) and is compatible with the polyamide resin member while the polyolefin resin is compatible with the polyolefin resin member. Hence, the present inventors surmise that the joining layer makes it possible to join joined members in any case where each joined member is the metal member, the polyamide resin member, or the polyolefin resin member. Moreover, the present inventors surmise that as also indicated in Patent Literature 2, since the co-continuous phase can add rigidity to a joined bopy, such rigidity makes it possible to exhibit an excellent tensile shear strength and further improve the joining strength of the joined body.

According to the present invention, it is possible to provide a joined body in which joined members are each at least one of a metal member, a polyamide resin member, and a polyolefin resin member and which is excellent in joining strength between these joined members.

DETAILED DESCRIPTION OF THE PREFERRED EMBODIMENTS

Figure 1:
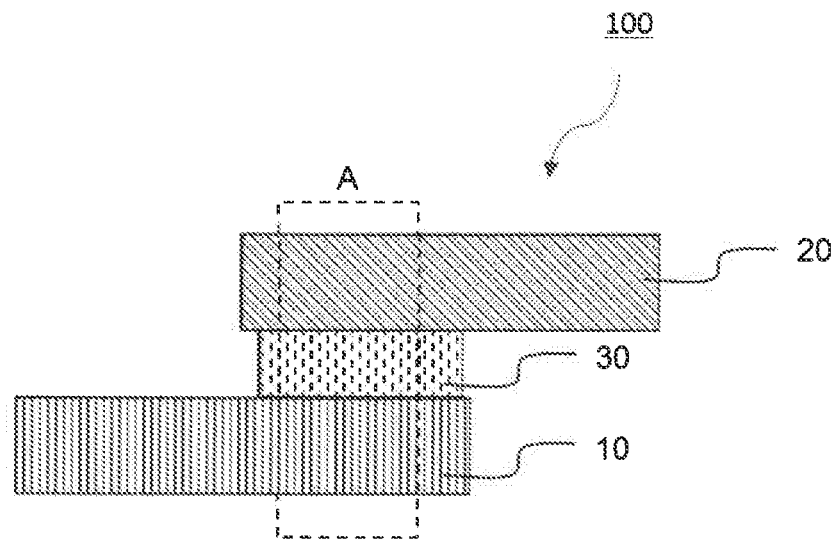
FIG. 1 is a schematic vertical cross-sectional view of a joined body obtained in each of Examples and Comparative Examples.

Hereinafter, the present invention is described in detail with reference to a preferred embodiment of the present invention. A joined body of the present invention is a joined body comprising: a first joined member; a second joined member; and a joining layer that joins the first joined member and the second joined member, wherein the first joined member and the second joined member are each independently one selected from the group consisting of a metal member, a polyamide resin member, and a polyolefin resin member, the joining layer is a layer formed of a resin composition containing a polyamide resin, a polyolefin resin, a modified elastomer having a reactive group capable of reacting with the polyamide resin, and a reaction product of the polyamide resin and the modified elastomer, the resin composition has a co-continuous phase including a continuous phase A formed of the polyamide resin and a continuous phase B formed of the polyolefin resin and has a dispersed domain a distributed in the continuous phase A, a finely dispersed subdomain a' distributed in the dispersed domain a, a dispersed domain b distributed in the continuous phase B, and a finely dispersed subdomain b' distributed in the dispersed domain b, the dispersed domain a is a dispersed domain formed of at least one selected from the group consisting of the polyolefin resin, and the reaction product of the polyamide resin and the modified elastomer, the dispersed domain b is a dispersed domain formed of at least one selected from the group consisting of the polyamide resin, and the reaction product of the polyamide resin and the modified elastomer, when the dispersed domain a is formed of the polyolefin resin, the finely dispersed subdomain a' is a finely dispersed subdomain formed of at least one selected from the group consisting of the polyamide resin, the modified elastomer, and the reaction product of the polyamide resin and the modified elastomer, when the dispersed domain a is formed of the reaction product of the polyamide resin and the modified elastomer, the finely dispersed subdomain a' is a finely dispersed subdomain formed of at least one selected from the group consisting of the polyamide resin, the polyolefin resin, and the modified elastomer, when the dispersed domain b is formed of the polyamide resin, the finely dispersed subdomain b' is a finely dispersed subdomain formed of at least one selected from the group consisting of the polyolefin resin, the modified elastomer, and the reaction product of the polyamide resin and the modified elastomer, and when the dispersed domain b is formed of the reaction product of the polyamide resin and the modified elastomer, the finely dispersed subdomain b' is a finely dispersed subdomain formed of at least one selected from the group consisting of the polyamide resin, the polyolefin resin, and the modified elastomer.

<Joined Member>

In the joined body of the present invention, the first joined member and the second joined member are members joined to each other by the joining layer, and are each independently one selected from the group consisting of a metal member, a polyamide resin member, and a polyolefin resin member. The first joined member and the second joined member may be the same members or different members from each other. In the present invention, since the joining layer according to the present invention, which is described later, can exhibit an excellent joining strength with the metal member and with the polyolefin resin member or the polyamide resin member, the joined body may be a joined body in which the first joined member is the metal member and the second joined member is one selected from the group consisting of the polyamide resin member and the polyolefin resin member, and more preferably, a joined body in which the first joined member is the metal member and the second joined member is the polyolefin resin member (Note that in such combination, the first joined member and the second joined member may be reversed).

The shapes of the first joined member and the second joined member according to the present invention can be designed as appropriate according to the application of the joined body, and is not particularly limited and may be each independently any shape such as a fiber shape, a particle shape, or a plate shape. On the other hand, the shapes of the surfaces joining the joined members are also not particularly limited, and may be each independently any shape such as a planar surface, a spherical surface, or a uneven surface.

(Metal Member)

The metal member constituting the first joined member and/or the second joined member according to the present invention is a member formed of a metal. Note that in the present invention, the "member formed of a metal" does not exclude any possibility that another component than the metal is mixed within the range that does not impair the effects of the present invention.

The metal constituting the metal member according to the present invention includes aluminum (Al), iron (Fe), copper (Cu), titanium (Ti), magnesium (Mg), zinc (Zn), tin (Sn), nickel (Ni), and the like. The metal member may be a member formed of one metal among them or may be a member formed of two or more metals among them or a member formed of an alloy of any of these with another metal (for example, an alloy of Al, Si, Mg, and Cu). Among these, the metal is preferably at least one selected from the group consisting of aluminum, iron, copper, and titanium, and more preferably aluminum, from the viewpoint that such metal tends to make the joining strength higher.

(Polyamide Resin Member)

The polyamide resin member constituting the first joined member and/or the second joined member according to the present invention is a member containing a polyamide resin. In the present invention, the polyamide resin refers to polymers (polyamides) having a chain skeleton made up with a plurality of monomers polymerized with an amide linkage (—NH—CO—) and mixture of these polymers.

The monomer constituting the polyamide includes amino acids such as aminocaproic acid, 11-aminoundecanoic acid, aminododecanoic acid, and p-aminomethylbenzoic acid; lactams such as ε-caprolactam, undecanlactam, ω-lauryl lactam, and the like. One of these monomers may be used solely or two or more of these may be used in combination.

In addition, the polyamide may be a copolymer having a diamine and a dicarboxylic acid as monomers. The diamine includes, for example, aliphatic diamines such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexanediamine and bis-(4-aminocyclohexyl)methane; and aromatic diamines such as xylylenediamine, p-phenylenediamine, and m-phenylenediamine. One of these may be used solely or two or more of these may be used in combination. The dicarboxylic acid includes, for example, aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexane dicarboxylic acid; and aromatic dicarboxylic acids such as phthalic acid, terephthalic acid, isophthalic acid, and naphthalene dicarboxylic acid. One of these may be used solely or two or more of these may be used in combination.

Such a polyamide includes, for example, polyamide 11 (PA11), polyamide 12 (PA12), polyamide 6 (PA6), polyamide 66 (PA66), polyamide 610, polyamide 612, polyamide 6T (PA6T), polyamide 6I (PA6I), polyamide 9T (PA9T), polyamide M5T (PAM5T), polyamide 1010 (PA1010), polyamide 1012 (PA1012), and the like. One of these may be used solely or two or more of these may be used in combination.

Polyamide 11 is a polyamide obtained by using a monomer having 11 carbon atoms as the monomer and contains an amide linkage-containing unit having 11 carbon atoms in the main chain. The monomer having 11 carbon atoms is preferably 11-aminoundecanoic acid and undecanlactam. Among these, polyamide 11 obtained by polymerizing only 11-aminoundecanoic acid as the monomer is desirable from the viewpoint of environmental protection (particularly from the viewpoint of carbon neutrality) since the 11-aminoundecanoic acid is a compound obtained from castor oil. In addition, such polyamide 11 may contain solely one of a constitutional unit derived from a monomer having less than 11 carbon atoms, a constitutional unit derived from a monomer having 12 or more carbon atoms, and another constitutional unit, or two or more of these constitutional units in combination. However, the content of the constitutional unit derived from the monomer having 11 carbon atoms is preferably 50% by mol or more, and more preferably 100% by mol, of the whole constitutional units in polyamide 11.

Polyamide 12 is a polyamide resin obtained by using a monomer having 12 carbon atoms as the monomer and contains an amide linkage-containing unit having 12 carbon atoms in the main chain. The monomer having 12 carbon atoms includes lauryl lactam. In addition, such polyamide 12 may contain solely one of a constitutional unit derived from a monomer having less than 12 carbon atoms, a constitutional unit derived from a monomer having 13 or more carbon atoms, and another constitutional unit, or two or more of these constitutional units in combination. However, the content of the constitutional unit derived from the monomer having 12 carbon atoms is preferably 50% by mol or more, and more preferably 100% by mol, of the whole constitutional units in polyamide 12.

Polyamide 6 is a polyamide obtained by polymerizing only ε-caprolactam among monomers having 6 carbon atoms. Polyamide 66 is a polyamide obtained by copolymerizing hexamethylene diamine and adipic acid. Polyamide 6T is a polyamide obtained by copolymerizing hexamethylene diamine and terephthalic acid.

Among the above-described polyamides, the polyamide resin constituting the polyamide resin member according to the present invention preferably contains at least one selected from the group consisting of aliphatic polyamides, more preferably contains at least one selected from the group consisting of polyamide 11, polyamide 12, polyamide 6, polyamide 66, polyamide 610, polyamide 612, polyamide 1010, and polyamide 1012, and particularly preferably contains at least one selected from the group consisting of polyamide 11, polyamide 12, polyamide 1010, and polyamide 1012 in 50% by mass or more, and more preferably in 100% by mass, of the total mass of the polyamide resins constituting the polyamide resin member, from the viewpoint that the joining strength tends to increase.

Although not particularly limited, the weight average molecular weight (in terms of polystyrene) of the polyamide resin according to the present invention is preferably 5,000 to 100,000, more preferably 7,500 to 70,000, and further preferably 10,000 to 50,000, as measured by gel permeation chromatography (GPC).

The polyamide resin member according to the present invention may further contain another component such as a filler or a compounding agent in addition the polyamide resin within the range that does not impair the effects of the present invention.

The filler includes fibrous or acicular fillers (for example, glass fibers, alumina fibers, carbon fibers, natural fibers, synthetic fibers, carbon nanotubes, and halloysite nanotubes), spherical fillers (for example, glass beads, spherical silica, and spherical alumina), amorphous fillers (for example, glass flakes, barium titanate, silicon carbide, and clay), and the like. One of these may be used solely or two or more of these may be used in combination. Among the above-described fillers, the filler is preferably at least one selected from the group consisting of glass fibers, carbon fibers, and alumina fibers from the viewpoint that these tend to be excellent in joining performance.

The compounding agent includes other thermoplastic resins, flame retardants, flame retardant aids, antioxidants, ultraviolet absorbers, coloring agents, heat stabilizers, nucleating agents, antibacterial and antifungal agents, antistatic agents, and the like. One of these may be used solely or two or more of these may be used in combination.

The other thermoplastic resins include polyester-based resins (for example, polybutylene terephthalate, polyethylene terephthalate, polybutylene succinate, polyethylene succinate, polylactic acid, polyhydroxy alkanoic acids), polycarbonate resins, and the like. One of these may be used solely or two or more of these may be used in combination.

The flame retardants include halogen-based flame retardants (for example, halogenated aromatic compounds), phosphorus-based flame retardants (for example, nitrogen-containing phosphate compounds, phosphate esters), nitrogen-based flame retardants (for example, guanidine, triazine, melamine, and derivatives of these), inorganic flame retardants (for example, metal hydroxides), boron-based flame retardants, silicone-based flame retardants, sulfur-based flame retardants, red phosphorus-based flame retardants, and the like. One of these may be used solely or two or more of these may be used in combination.

The flame retardant aids include various antimony compounds, metal compounds containing zinc, metal compounds containing bismuth, magnesium hydroxide, viscous silicate, and the like. One of these may be used solely or two or more of these may be used in combination. In addition, the coloring agents include pigments, dyes, and the like. One of these may be used solely or two or more of these may be used in combination.

When the polyamide resin member according to the present invention contains any of these other components, the content of the other component (the total content when two or more components are contained. The same applies hereinbelow.) is preferably 50% by mass or less and preferably above 0 and 30% by mass or less of the total mass of the polyamide resin member. If the content is more than the upper limit, the adhesion with the joining layer tends to decrease.

(Polyolefin Resin Member)

The polyolefin resin member constituting the first joined member and/or the second joined member according to the present invention is a member containing a polyolefin resin. In the present invention, the polyolefin resin refers to polymers (polyolefins) having an alkene (olefin) containing one carbon-carbon double bond as the monomer and mixtures of these.

The monomer constituting the polyolefin includes ethylene; α-olefins which are unsaturated hydrocarbon compounds having 3 to 20 carbon atoms (for example, propylene, 1-butene, 1-pentene, 1-hexene, 1-heptene, 3-methyl-1-butene, and 4-methyl-1-pentene), and the like. One of these may be used solely or two or more of these may be used in combination.

Such polyolefin is not particularly limited and includes, for example, polyethylene (PE), polypropylene (PP), ethylene-α-olefin copolymer, propylene-α-olefin copolymer, and the like. One of these may be used solely or two or more of these may be used in combination.

Among the above-described polyolefins, the polyolefin resin constituting the polyolefin resin member according to the present invention preferably contains at least one selected from the group consisting of polyethylene and polypropylene from the viewpoint that the joining strength tends to increase more, and preferably contains at least one selected from the group consisting of polyethylene and polypropylene in 50% by mass or more, and more preferably 100% by mass, of the total mass of the polyolefin resins constituting the polyolefin resin member. In addition, the content of the constitutional unit derived from propylene and ethylene (the total content when both are contained) is also preferably 50% by mol or more of the whole constitutional units in the polyolefin resin constituting the polyolefin resin member.

Although not particularly limited, the weight average molecular weight (in terms of polystyrene, temperature: 140 to 150° C.) of the polyolefin resin according to the present invention is preferably 10,000 to 500,000, more preferably 50,000 to 450,000, and further preferably 100,000 to 400,000, as measured by gel permeation chromatography (GPC).

The polyolefin resin member according to the present invention may further contain another component such as a filler or a compounding agent in addition to the above-described polyolefin resin within the range that does not impair the effects of the present invention. The filler and the compounding agent are as described in regard to the above-described polyamide resin member.

When the polyolefin resin member according to the present invention contains any of the above-described other components, the content of the other component (the total content when two or more components are contained. The same applies hereinbelow.) is preferably 50% by mass or less, and preferably above 0 and 30% by mass or less, of the total mass of the polyolefin resin member. If the content is more than the upper limit, the adhesion with the joining layer tends to decrease.

<Joining Layer>

The joining layer according to the present invention is a layer for joining and integrating the above-described first joined member and second joined member. The joining layer according to the present invention is formed of a resin composition having a co-continuous phase described below.

The shape of the joining layer according to the present invention is not particularly limited as long as the joining layer can fill at least part of the joining interfaces with the first joined member and the second joined member, and the joining layer may have any shape depending on the shapes of the first joined member and the second joined member. The thickness of the joining layer is also not particularly limited, but is preferably 10 to 1,000 μm, and more preferably 300 to 700 μm in average thickness, from the viewpoint of melting adhesion and compatibilization with the first joined member and the second joined member.

(Resin Composition)

The resin composition constituting the joining layer according to the present invention contains a polyamide resin, a polyolefin resin, a modified elastomer having a reactive group capable of reacting with the polyamide resin, and a reaction product of the polyamide resin and the modified elastomer. Such a resin composition is obtained by blending the polyamide resin, the polyolefin resin, and the modified elastomer. Such a resin composition includes, for example, a resin composition in which the first resin is the polyamide resin and the second resin is the polyolefin resin among the resin compositions described in Patent Literature 2 (Japanese Unexamined Patent Application Publication No. 2014-25060).

[Polyamide Resin]

The polyamide resin to be blended in the resin composition according to the present invention has the same meaning as that of the polyamide resin described in regard to the polyamide resin member. Among the above-described polyamide resins, the polyamide resin to be blended in the resin composition according to the present invention preferably has a melting point more similar to that of the polyolefin resin to be blended in the resin composition described below from the viewpoint that a more excellent adhesion strength tends to be achieved when the metal member is used as the first joined member and/or the second joined member. Specifically, the polyamide resin preferably contains at least one selected from the group consisting of aliphatic polyamides, more preferably contains at least one selected from the group consisting of polyamide 11, polyamide 12, polyamide 6, polyamide 66, polyamide 610, polyamide 612, polyamide 1010, and polyamide 1012, further preferably contains at least one selected from the group consisting of polyamide 11, polyamide 12, polyamide 1010, and polyamide 1012, still further preferably contains at least one selected from the group consisting of polyamide 11, polyamide 12, and polyamide 1012, and particularly preferably contains at least one selected from the group consisting of polyamide 11 and polyamide 12 in 50% by mass or more, and more preferably 100% by mass, of the total mass of the polyamide resin to be blended in the resin composition.

In addition, the polyamide resin to be blended in the resin composition according to the present invention preferably contains at least one selected from the group consisting of aliphatic polyamides from the viewpoint that a more excellent adhesion strength tends to be achieved when the polyamide resin member (a member containing at least one selected from the group consisting of preferably aliphatic polyamides, and more preferably polyamide 11, polyamide 12, polyamide 6, polyamide 66, polyamide 610, polyamide 612, polyamide 1010, and polyamide 1012) is used as the first joined member and/or the second joined member and from the viewpoint that such aliphatic polyamide has a melting point more similar to that of the polyolefin resin to be blended in the resin composition described below. The polyamide resin preferably contains at least one selected from the group consisting of polyamide 11, polyamide 12, polyamide 6, polyamide 66, polyamide 610, polyamide 612, polyamide 1010, and polyamide 1012 (more preferably, polyamide 11, polyamide 12, polyamide 1010, and polyamide 1012, and further preferably, polyamide 11, polyamide 12, and polyamide 1012), and particularly preferably contains at least one of these in 50% by mass or more, and more preferably in 100% by mass, of the total mass of the polyamide resin to be blended in the above-described resin composition.

[Polyolefin Resin]

The polyolefin resin to be blended in the resin composition according to the present invention has the same meaning as that of the polyolefin resin described in regard to the polyolefin resin member. Since the polyolefin resin is not compatible with the above-described polyamide resin, the continuous phase A formed of the polyamide resin and the continuous phase B formed of the polyolefin resin form a co-continuous phase in the resin composition according to the present invention.

Among the polyolefin resin, the polyolefin resin to be blended in the resin composition according to the present invention preferably contains at least one selected from the group consisting of polyethylene and polypropylene from the viewpoint that a more excellent adhesion strength tends to be achieved when the polyolefin resin member (a member containing preferably polyethylene and/or polypropylene, and more preferably polypropylene) is used as the first joined member and/or the second joined member. The content of the constitutional unit derived from propylene and ethylene (the total content when both are contained) is more preferably 50% by mol or more of the whole constitutional units in the polyolefin resin to be blended in the resin composition, and polypropylene is further preferable.

Note that the polyolefin resin to be blended in the resin composition according to the present invention is different from the modified elastomer described below in that the polyolefin resin is not compatible with the polyamide resin to be blended in the resin composition and also does not have a reactive group capable of reacting with the polyamide resin.

[Modified Elastomer]

The modified elastomer to be blended in the resin composition according to the present invention is an elastomer having a reactive group capable of reacting with the polyamide resin and functions as a compatibilizer making the polyamide resin and the polyolefin resin compatible with each other.

The elastomer is preferably a thermoplastic elastomer, and more preferably at least one selected from the group consisting of an olefin-based thermoplastic elastomer and a styrene-based thermoplastic elastomer, from the viewpoint that such a thermoplastic elastomer has a higher reactivity and more easily makes the resins compatible with each other.

The olefin-based thermoplastic elastomer includes, for example, copolymers having two or more of α-olefins such as ethylene, propylene, 1-butene, 1-pentene, and 1-octene as monomers. As the olefin-based thermoplastic elastomer, one of these may be used solely or two or more of these may be used in combination. Among these, the olefin-based thermoplastic elastomer is preferably at least one selected from the group consisting of copolymers of ethylene or propylene and α-olefins having 3 to 8 carbon atoms, that is, copolymers of ethylene and α-olefins having 3 to 8 carbon atoms and copolymers of propylene and α-olefins having 4 to 8 carbon atoms, from the viewpoint that such olefin-based thermoplastic elastomer tends to further improve the rigidity and the impact strength of the resin composition and further improve the joining performance of the joined body. Specifically, the olefin-based thermoplastic elastomer includes, for example, ethylene-propylene copolymer (EPR), ethylene-1-butene copolymer (EBR), ethylene-1-pentene copolymer, ethylene-1-octene copolymer (EOR), propylene-1-butene copolymer (PBR), propylene-1-pentene copolymer, and propylene-1-octene copolymer (POR). Among these, the olefin-based thermoplastic elastomer is preferably at least one selected from the group consisting of EBR, EOR, and PBR, from the viewpoint that such olefin-based thermoplastic elastomer tends to further improve the rigidity and the impact strength of the resin composition and further improve the joining performance of the joined body.

The styrene-based thermoplastic elastomer includes block copolymers of styrene-based compounds and conjugated diene compounds and hydrogenated products thereof, and one of these may be used solely or two or more of these may be used in combination. The styrene-based compound includes, for example, styrene; alkyl styrenes such as α-methyl styrene, p-methyl styrene, and p-t-butyl styrene; p-methoxy styrene; and vinylnaphthalene. In addition, the conjugated diene compound includes butadiene, isoprene, piperylene, methylpentadiene, phenyl butadiene, 3,4-dimethyl-1,3-hexadiene, 4,5-diethyl-1,3-octadiene, and the like. The styrene-based thermoplastic elastomer specifically includes, for example, styrene-butadiene-styrene copolymer (SBS), styrene-isoprene-styrene copolymer (SIS), styrene-ethylene/butylene-styrene copolymer (SEBS), and styrene-ethylene/propylene-styrene copolymer (SEPS). Among these, SEBS is preferable from the viewpoint that SEBS tends to further improve the rigidity and the impact strength of the resin composition and further improve the joining performance of the joined body.

The reactive group capable of reacting with the polyamide resin includes an acid anhydride group (—CO—O—OC—), a carboxyl group (—COOH), an epoxy group [—$C_2O$ (a three-membered ring structure composed of 2 carbon atoms and 1 oxygen atom)], an oxazoline group (—$C_3H_4NO$), an isocyanate group (—NCO), and the like. One of these may be used solely or two or more of these may be used in combination. Among these, the reactive group is preferably the acid anhydride group from the viewpoint that the acid anhydride group tends to have a higher reactivity with the polyamide resin.

In addition, the method for adding the reactive group to the elastomer is not particularly limited, and any publicly-known method may be used as appropriate. For example, the method includes a method including adding an acid anhydride as a monomer when the elastomer is synthesized. The acid anhydride includes maleic anhydride, phthalic anhydride, itaconic anhydride, succinic anhydride, glutaric anhydride, adipic anhydride, citraconic anhydride, tetrahydrophthalic anhydride, butenyl succinic anhydride, and the like. One of these may be used solely or two or more of these may be used in combination. Among these, the acid anhydride is preferably at least one selected from the group consisting of maleic anhydride, phthalic anhydride, and itaconic anhydride, and more preferably maleic anhydride, from the viewpoint that such acid anhydride tends to have a higher reactivity.

The modified elastomer specifically includes maleic anhydride-modified olefin-based thermoplastic elastomers such as maleic anhydride-modified EPR, maleic anhydride-modified PBR, maleic anhydride-modified EBR, maleic anhydride-modified EOR, and maleic anhydride-modified POR; maleic anhydride-modified styrene-based thermoplastic elastomers such as maleic anhydride-modified SEBS, maleic anhydride-modified SBS, maleic anhydride-modified SIS, and maleic anhydride-modified SEPS; and the like. One of these may be used solely or two or more of these may be used in combination. Among these, the modified elastomer according to the present invention is preferably a copolymer of ethylene or propylene and an α-olefin having 3 to 8 carbon atoms that has an acid anhydride group as the reactive group, and more preferably at least one selected from the group consisting of maleic anhydride-modified PBR, maleic anhydride-modified EBR, and maleic anhydride-modified EOR, from the viewpoint that such modified elastomer is more compatible with the polyolefin resin to be blended in the resin composition.

In addition, although not particularly limited, the weight average molecular weight (in terms of polystyrene) of the modified elastomer is preferably 10,000 to 500,000, more preferably 20,000 to 500,000, and further preferably 25,000 to 400,000, as measured by gel permeation chromatography (GPC), from the viewpoint that the larger the weight average molecular weight is, the higher the impact strength of the resin composition tends to be.

[Reaction Product of Polyamide Resin and Modified Elastomer]

The reaction product of the polyamide resin and the modified elastomer which is contained in the resin composition according to the present invention is a component which is generated by the reactive group of the modified elastomer reacting with the polyamide resin. The method for obtaining such a reaction product of the polyamide resin and the modified elastomer is not particularly limited and, for example, the reaction product can be obtained in the resin composition by melt-kneading the polyamide resin and the modified elastomer in the step of obtaining the resin composition in the method for producing the joined body, described below.

[Co-Continuous Phase]

The resin composition constituting the joining layer according to the present invention has a co-continuous phase including a continuous phase A formed of the polyamide resin and a continuous phase B formed of the polyolefin resin and also has a dispersed domain a distributed in the continuous phase A, a finely dispersed subdomain a' distributed in the dispersed domain a, a dispersed domain b distributed in the continuous phase B, and a finely dispersed subdomain b' distributed in the dispersed domain b. In the present invention, the co-continuous phase refers to a structure in which two or more continuous phases (the continuous phase A and the continuous phase B in the present invention) are three-dimensionally and continuously connected. The co-continuous phase according to the present invention has a microstructure containing the above-described dispersed domains and finely dispersed subdomains.

In the present invention, the phase structure of the resin composition can be observed using an electron microscope. Such observation method includes, for example, a method including: performing oxygen plasma etching on the cross-section of the resin composition molded by injection molding or heat press molding at 100 W for 1 minute; and then observing the cross-section with a field emission scanning electron microscope (FE-SEM, "S-4300 TYPE II" (acceleration voltage 3 kV) manufactured by Hitachi High-Tech Manufacturing & Service Corporation). Note that each phase in the resin composition can be identified by performing energy-dispersive X-ray spectroscopy (EDX) to determine the presence or absence of a peak originated from each resin during the observation using the field emission scanning electron microscope.

In the co-continuous phase of the resin composition according to the present invention, the ratio of the content of the continuous phase A (the total content including the dispersed domain a and the finely dispersed subdomain a' described later) and the content of the continuous phase B (the total content including the dispersed domain b and the finely dispersed subdomain b' described later) (the mass of the continuous phase A: the mass of the continuous phase B) is preferably 5:1 to 1:5, and more preferably 3:1 to 1:3. If the content of the continuous phase B relative to the continuous phase A is less than the lower limit or more than the upper limit, the co-continuous phase tends not to be formed in either case.

<Continuous Phase A>

The resin composition according to the present invention contains the dispersed domain a distributed in at least one of the continuous phase A. The dispersed domain a is a dispersed domain formed of at least one selected from the group consisting of the polyolefin resin, and the reaction product of the polyamide resin and the modified elastomer. Such a dispersed domain a is preferably a dispersed domain formed of the polyolefin resin and a dispersed domain formed of the reaction product of the polyamide resin and the modified elastomer from the viewpoint that such a dispersed domain a tends to be easily distributed in the continuous phase A.

The content of the dispersed domain a is preferably 1 to 50% by area, and more preferably 5 to 40% by area, relative to the total area of the continuous phase A (the area including the dispersed domain a and the finely dispersed subdomain a') in the cross-section of the molded resin composition. If the content of the dispersed domain a is less than the lower limit, the impact strength of the resin composition tends to decrease. On the other hand, if the content of the dispersed domain a is more than the upper limit, the formation of the dispersed domain a tends to be difficult.

In addition, regarding the dispersed domain a, the average diameter of the whole dispersed domain a including a dispersed domain a having the finely dispersed subdomain a', which is described later, and a dispersed domain a not having the finely dispersed subdomain is preferably 0.05 to 8 μm, and more preferably 0.1 to 4 μm. If the average diameter of the whole dispersed domain a is less than the lower limit, the joining performance of the joined body tends to decrease because the resin composition has a lower rigidity. On the other hand, if the average diameter of the whole dispersed domain a is more than the upper limit, the forming of the dispersed domain a tends to be difficult.

Moreover, regarding the dispersed domain a, the average diameter of the dispersed domain a having the finely dispersed subdomain a', which is described later, is preferably 0.1 to 10 μm, and more preferably 0.2 to 6 μm. If the average diameter of the dispersed domain a having the finely dispersed subdomain a' is less than the lower limit, it tends to be difficult to have the finely dispersed subdomain a'. On the other hand, if the average diameter of the dispersed domain a having the finely dispersed subdomain a' is more than the upper limit, the forming of the dispersed domain a tends to be difficult.

Note that in the present invention, the average diameter of these dispersed domains a can be obtained by measuring any 100 pieces or more dispersed domains in the molded resin composition with a scanning electron microscope (SEM) to obtain the diameter of each dispersed domain, and averaging the values of the diameters. In addition, such diameter means the maximum diameter of the cross-section of each dispersed domain, and if the cross-section of the dispersed domain is not circular, means the diameter of the maximum circumscribed circle of the cross-section.

Moreover, the resin composition according to the present invention contains the finely dispersed subdomain a' distributed in at least one of the dispersed domain a. When the dispersed domain a is a dispersed domain formed of the polyolefin resin, the finely dispersed subdomain a' is a finely dispersed subdomain formed of at least one selected from the group consisting of the polyamide resin, the modified elastomer, and the reaction product of the polyamide resin and the modified elastomer. On the other hand, when the dispersed domain a is a dispersed domain formed of the reaction product of the polyamide resin and the modified elastomer, the finely dispersed subdomain a' is a finely dispersed subdomain formed of at least one selected from the group consisting of the polyamide resin, the polyolefin resin, and the modified elastomer. The finely dispersed subdomain a' is preferably present in the dispersed domain a formed of at least the polyolefin resin, and more preferably is a finely dispersed subdomain formed of at least the reaction product of the polyamide resin and the modified elastomer, from the viewpoint that such finely dispersed subdomain a' is more compatible.

The content of the finely dispersed subdomain a' is preferably 1 to 50% by area, and more preferably 5 to 40% by area, relative to the total area of the dispersed domain a in the cross-section of the molded resin composition (the total area including the finely dispersed subdomain a'). If the content of the finely dispersed subdomain a' is less than the lower limit, the impact strength of the resin composition tends to decrease. On the other hand, if the content of the finely dispersed subdomain a' is more than the upper limit, the forming of the finely dispersed subdomain a' tends to be difficult.

In addition, the average diameter of the finely dispersed subdomain a' is preferably 5 to 500 nm, more preferably 10 to 450 nm, and further preferably 15 to 400 nm. if the average diameter is less than the lower limit, the joining performance of the joined body tends to decrease because the resin composition has a lower rigidity. On the other hand, if the average diameter is more than the upper limit, the forming of the finely dispersed subdomain a' tends to be difficult. Note that in the present invention, the average diameter of the finely dispersed subdomain a' can be obtained in the same manner as that for the average diameter of the dispersed domain a described above.

<Continuous Phase B>

The resin composition according to the present invention contains the dispersed domain b distributed in at least one of the continuous phase B. The dispersed domain b is a dispersed domain formed of at least one selected from the group consisting of the polyamide resin, and the reaction product of the polyamide resin and the modified elastomer. Such dispersed domain b is preferably a dispersed domain formed of at least the reaction product of the polyamide resin and the modified elastomer from the viewpoint that such dispersed domain is more compatible with the continuous phase B.

The content of the dispersed domain b is preferably 1 to 50% by area, and more preferably 5 to 40% by area, relative to the total area of the continuous phase B in the cross-section of the molded resin composition (the total area including the dispersed domain b and the finely dispersed subdomain b'). If the content of the dispersed domain b is less than the lower limit, the impact strength of the resin composition tends to decrease. On the other hand, if the content of the dispersed domain b is more than the upper limit, the forming of the dispersed domain b tends to be difficult.

In addition, regarding the dispersed domain b, the average diameter of the whole dispersed domain b including a dispersed domain b having the finely dispersed subdomain b', which is described later, and a dispersed domain b not having the finely dispersed subdomain is preferably 0.05 to 8 µm, and more preferably 0.1 to 4 µm. If the average diameter of the whole dispersed domain b is less than the lower limit, the joining performance of the joined body tends to decrease because the resin composition has a lower rigidity. On the other hand, if the average diameter of the whole dispersed domain b is more than the upper limit, the forming of the dispersed domain b tends to be difficult.

Moreover, regarding the dispersed domain b, the average diameter of the dispersed domain b having the finely dispersed subdomain b', which is described later, is preferably 0.1 to 10 µm, and more preferably 0.2 to 6 µm. If the average diameter of the dispersed domain b having the finely dispersed subdomain b' is less than the lower limit, it tends to be difficult to have the finely dispersed subdomain b'. On the other hand, if the average diameter of the dispersed domain b having the finely dispersed subdomain b' is more than the upper limit, the forming of the dispersed domain b tends to be difficult. Note that in the present invention, the average diameter of the dispersed domain b can be obtained in the same manner as that for the average diameter of the dispersed domain a described above.

Furthermore, the resin composition according to the present invention contains the finely dispersed subdomain b' distributed in at least one of the dispersed domain b. When the dispersed domain b is a dispersed domain formed of the polyamide resin, the finely dispersed subdomain b' is a finely dispersed subdomain formed of at least one selected from the group consisting of the polyolefin resin, the modified elastomer, and the reaction product of the polyamide resin and the modified elastomer. On the other hand, when the dispersed domain b is a dispersed domain formed of the reaction product of the polyamide resin and the modified elastomer, the finely dispersed subdomain b' is a finely dispersed subdomain formed of at least one selected from the group consisting of the polyamide resin, the polyolefin resin, and the modified elastomer. The finely dispersed subdomain b' is preferably present in the dispersed domain b formed of at least the reaction product of the polyamide resin and the modified elastomer, and more preferably is a finely dispersed subdomain formed of at least the modified elastomer, from the viewpoint that such dispersed domain b is more compatible.

The content of the finely dispersed subdomain b' is preferably 1 to 50% by area, and more preferably 5 to 40% by area, relative to the total area of the dispersed domain b in the cross-section of the molded resin composition (the total area including the finely dispersed subdomain b'). If the content of the finely dispersed subdomain b' is less than the lower limit, the impact strength of the resin composition tends to decrease. On the other hand, if the content of the finely dispersed subdomain b' is more than the upper limit, the forming of the finely dispersed subdomain b' tends to be difficult.

In addition, the average diameter of the finely dispersed subdomain b' is preferably 5 to 500 nm, more preferably 10 to 450 nm, and further preferably 15 to 400 nm. If the average diameter is less than the lower limit, the joining performance of the joined body tends to decrease because the resin composition has a lower rigidity. On the other hand, if the average diameter is more than the upper limit, the forming of the finely dispersed subdomain b' tends to be difficult. Note that in the present invention, the average diameter of the finely dispersed subdomain b' can be obtained in the same manner as that for the average diameter of the dispersed domain a described above.

Moreover, it is preferable that the resin composition according to the present invention further have a dispersed domain formed of the modified elastomer in the continuous phase of at least one selected from the group consisting of the continuous phase A and the continuous phase B from the viewpoint that the impact strength tends to be further improved. When the dispersed domain formed of the modified elastomer is contained, the content of the dispersed domain formed of the modified elastomer is preferably 1 to 30% by mass, and more preferably 5 to 20% by mass, relative to the total content of the continuous phase containing the dispersed domain (the total content including the dispersed domain and the finely dispersed subdomain). If the content of the dispersed domain formed of the modified elastomer is less than the lower limit, the effect of improving the impact strength of the resin composition tends not to be exhibited. On the other hand, if the content of the dispersed domain formed of the modified elastomer is more than the upper limit, the joining performance of the joined body tends to decrease because the resin composition has a lower rigidity.

In addition, the resin composition according to the present invention may further contain another component such as a filler or a compounding agent in addition to the polyamide resin, the polyolefin resin, the modified elastomer, and the reaction product of the polyamide resin and the modified elastomer within the range that does not impair the effects of the present invention. The filler and the compounding agent are as described in regard to the above-described polyamide resin member.

When the resin composition according to the present invention further contains any of the above-described other components, the content of the other components (the total content when two or more components are contained. The same applies hereinbelow.) is preferably 40% by mass or less of the total mass of the resin composition (that is, the joining layer). If the content is more than the upper limit, the adhesion with the joining layer tends to decrease.

<Method for Producing Joined Body>

The method for producing the joined body of the present invention is not particularly limited, and a conventional publicly-known method and a method according thereto may be employed as appropriate. For example, such a method includes a method including: first molding a sheet from the resin composition; then inserting the sheet between the first joined member and the second joined member; heating and pressing a resultant product, and then leaving the resultant product to cool down to form the joining layer which joins first joined member and the second joined member, obtaining a joined body in which the first joined member/the joining layer/the second joined member are disposed in this order.

The resin composition according to the present invention can be obtained by reacting the polyamide resin and the modified elastomer in a specific ratio in advance, and then compounding the obtained product with the polyolefin resin. Such a method is preferably a method including: first preparing a mixed resin by melt-kneading the polyamide resin and the modified elastomer; and subsequently melt-kneading the mixed resin and the polyolefin resin, from the viewpoint that the modified elastomer can be more effectively allowed to function and the resin composition according to the present invention can be efficiently and surely obtained. The method may be such that the mixed resin, which can be obtained as a solid product and/or a molten product, and the polyolefin resin are melt-kneaded, or that the polyamide resin and the modified elastomer are melt-kneaded in an upstream side by using a multi-stage blending-type kneading apparatus or the like, and then the polyolefin resin is added in a downstream side, followed by melt-kneading to obtain the resin composition.

The method for the melt-kneading includes, for example, methods using extruders (for example, single-screw extruders and twin-screw melt-kneading extruders), kneaders, mixers (for example, high-speed mixers, paddle mixers, and ribbon mixers), and the like. One of these may be used solely or two or more of these may be used in combination. In addition, when two or more methods are used in combination, the machines may be operated in a continuous manner or in a batch manner. Moreover, the components charged may be kneaded at once, or at least one of the components charged may be added stepwise multiple times (multi-stage blending) and kneaded.

The temperature for the melt-kneading is not particularly limited and cannot be clearly said to be a certain temperature because the temperature should be adjusted as appropriate depending on the type of each component to be charged. However, the temperature is preferably 100 to 350° C., more preferably 180 to 320° C., and further preferably 200 to 300° C., from the viewpoint that such temperature allows the components charged to be mixed while being melted.

In the method for obtaining the resin composition, the amount of the polyamide resin charged, the amount of the polyolefin resin charged, and the amount of the modified elastomer charged are preferably 10 to 80% by mass: 10 to 80% by mass: 1 to 20% by mass, and more preferably 25 to 75% by mass: 25 to 75% by mass: 1 to 10% by mass, in ratios of the contents relative to the total amount of these charged (the amount of the polyamide resin charged: the amount of the polyolefin resin charged: the amount of the modified elastomer charged).

Moreover, for example, when the polyamide resin is polyamide 11 and/or polyamide 12, the amount of the polyamide 11 and/or polyamide 12 charged is further preferably 40 to 69% by mass, still further preferably 50 to 65% by mass, and particularly preferably 59 to 63% by mass, relative to the total charged amount. In addition, for example, when the polyamide resin is polyamide 6, the amount of the polyamide 6 charged is further preferably 26 to 44% by mass, still further preferably 30 to 40% by mass, and particularly preferably 33 to 37% by mass, relative to the total charged amount. If the amount of the polyamide resin charged is out of the above-described ranges, the co-continuous phase according to the present invention is unlikely to be formed in the resin composition, and the joining strength tends to decrease.

In addition, in the present invention, for example, when the polyamide resin is polyamide 11 and/or polyamide 12, the amount of the polyolefin resin charged and the amount of the modified elastomer charged are preferably 20 to 50% by mass and 1 to 30% by mass, and more preferably 25 to 40% by mass and 5 to 20% by mass, relative to the total charged amount, respectively. Moreover, for example, when the polyamide resin is polyamide 6, the amount of the polyolefin resin charged and the amount of the modified elastomer charged are preferably 45 to 65% by mass and 1 to 30% by mass, and more preferably 50 to 60% by mass and 5 to 20% by mass, relative to the total charged amount, respectively.

By such a method, it is possible to efficiently and surely obtain the resin composition according to the present invention as a solid product or a molten product. The method for molding, from the obtained resin composition, a sheet to be used for manufacturing a joined body of the present invention is not particularly limited, and a conventional publicly-known method and a method according thereto may be employed as appropriate. For example, the sheet can be manufactured by injection molding and heat press molding.

The temperature at which the first joined member and the second joined member with the sheet interposed therebetween is crimped while being heated (heating and crimping) is preferably 180 to 250° C. If the temperature is less than the lower limit, the adhesion between the joined member and the joining layer tends to decrease because each resin component is not sufficiently melted. On the other hand, if the temperature is more than the upper limit, it tends to be difficult to obtain a strong joining layer because the joined member containing resins or the resin composition is melted too much.

In addition, the pressurizing force during the crimping is not particularly limited but is preferably 1 to 100 kPa, for example. If the pressurizing force is less than the lower limit, the joining strength tends to decrease because when there is unevenness in the joining surface of the joined member, it is difficult to bring and form the joining layer into intimate contact. On the other hand, if the pressurizing force is more than the upper limit, it tends to be difficult to obtain a strong joining layer because the resin composition spreads too much.

Moreover, the time for the heating and crimping is not particularly limited, but is preferably 1 to 60 seconds, and more preferably 10 to 30 seconds, for example. In addition, the atmosphere for the heating and crimping is not particularly limited but may be an inert gas or reducing gas atmosphere, from the viewpoint of preventing the joined member and the resin composition from being oxidized. Further, the conditions for cooling after the heating and crimping are also not particularly limited but it is usually preferable that the heated and crimped product be left standing until the temperature becomes 10 to 50° C.

<Joined Body>

In the joined body of the present invention, since 26 the joining layer can easily join any of the joining layer is the metal member, the polyamide resin member, and the polyolefin resin member, a sufficiently large joining strength can be achieved, in any case where the combination of first joined member-second joined member (or the combination of second joined member-first joined member) is the metal member—the metal member, the metal member—the polyamide resin member or the polyolefin resin member, or the polyamide resin member or the polyolefin resin member—the polyamide resin member or the polyolefin resin member.

In addition, in the joined body of the present invention, an excellent joining strength can be achieved as described above even when a primer is not applied to or a surface treatment is not performed on the joining surfaces of the first joined member and the second joined member. The joined body may include a layer other than the joining layer between the first joined member and/or the second joined member and the joining layer in addition to the first joined member, the second joined member, and the joining layer within the range that does not impair the effects of the present invention.

Such another layer includes, for example, layers formed of resin compositions and having a sea-island structure or a salami structure as described in Patent Literatures 3 to 8 [specifically, for example, a layer formed of a resin composition having a dispersed domain formed of the polyamide resin (preferably, a polyamide resin containing at least one selected from the group consisting of polyamide 11, polyamide 12, polyamide 6, polyamide 66, polyamide 610, polyamide 612, polyamide 1010, and polyamide 1012) in a continuous phase formed of the polyolefin resin (preferably, a polyolefin resin containing at least one selected from the group consisting of polyethylene and polypropylene); a layer formed of a resin composition having a dispersed domain formed of the polyolefin resin in a continuous phase formed of the polyamide resin]. In a case where the first joined member and/or the second joined member is one selected from the group consisting of the polyamide resin member and the polyolefin resin member, when a layer having the sea-island structure or salami structure is further included between the polyamide resin member and the joining layer or between the polyolefin resin member and the joining layer, a sufficient joining strength tends to be achieved.

In addition, the shape, size, thickness, and the like of the joined body of the present invention can be designed as appropriate depending on its application and are not specifically limited. For example, the joined body of the present invention may be such that the entirety of one surface of the first joined member and the entirety of one surface of the second joined member are joined by the joining layer, that part of at least one surface of at least one of the joined members is joined with the other joined member by the joining layer, or that another joining layer according to the present invention or a layer given above as a layer other than the joining layer is further included on a surface of the first joined member and/or the second joined member opposite or different from the surface on the joining layer side.

In addition, the application of the joined body of the present invention is not particularly limited and the joined body of the present invention may be used for encapsulants for batteries, encapsulants for engine control unit (ECUs) boxes, potting materials, and the like.

EXAMPLES

Hereinafter, the present invention is described in more detail based on Examples and Comparative Examples; however, the present invention is not limited to the following Examples.

Example 1

First, polyamide 11 (PA11, "Rilsan BMNO" manufactured by Arkema, weight average molecular weight: 18,000) and maleic anhydride-modified ethylene-1-butene copolymer (m-EBR, "Tafmer MH7020" manufactured by Mitsui Chemicals) were mixed in advance in dry blending such that the mass ratio (the mass of the PA11:the mass of the m-EBR) became 60:10, and were thermally melt-kneaded using a twin-screw melt-kneading extruder (screw diameter: 15 mm, L/D=59) ("KZW15-60MG" manufactured by Technovel Corporation) under conditions of a temperature of 210° C., an extrusion rate of 2 kg/hr, and a screw rotation speed of 200 rpm. Subsequently, the melt-kneaded product extruded was cut out using a pelletizer to obtain mixed resin having a pellet shape.

Subsequently, the mixed resin obtained and polypropylene (PP, "Novatec MAIB" manufactured by Japan Polypropylene Corporation, weight average molecular weight:312,000) were mixed in dry blending such that the mass ratio (the mass of the mixed resin:the mass of the PP) became 70:30, and were thermally melt-kneaded under the same conditions as those described above. Subsequently, the melt-kneaded product extruded was cut out using a pelletizer to obtain a resin composition 1 having a pellet shape. Subsequently, an open stainless steel mold having a thickness of 500 μm was set on a desktop-type hot press ("TW-08-S" manufactured by Takachiho Inc. Corporation), and the resin composition 1 obtained was placed inside the stainless steel mold and pressed at 200° C. with 200 kgf/cm$^2$ for 1 minute to fabricate a sheet, which was then cut into a piece having a length of 5 mm×a width of 25 mm×a thickness of 500 μm as a sheet 1.

Subsequently, an aluminum plate (a length of 100 mm×a width of 25 mm×a thickness of 1.5 mm) formed of aluminum (A5052) as the first joined member and a polypropylene plate (a length of 50 mm×a width of 25 mm×a thickness of 1.5 mm) formed of polypropylene (PP, "Novatec MA1B" manufactured by Japan Polypropylene Corporation, weight average molecular weight: 312,000) as the second joined member were prepared. The sheet 1 was placed on an end of one surface of the aluminum plate, which was placed on a hot plate and heated at 200° C. for 1 minute. Thereafter, with the temperature being kept at 200° C., one surface of the polypropylene plate was placed on a surface of the sheet 1 on the opposite side from the aluminum plate and was pressed lightly for 30 seconds (pressurizing force: approximately 300 kPa) to be joined thereto. This was unloaded from the hot plate, and was left to be cooled at room temperature (approximately 25° C.) to obtain a joined body 101 in which the first joined member 10 (aluminum plate)/the joining layer 31 (resin composition 1)/the second joined member 20 (polypropylene plate) were stacked in this order.

In each of Example 1 as well as Examples and Comparative Examples described below, the first joined member 10/the joining layer 30/the second joined member 20 were stacked as shown in a schematic vertical cross-sectional view of FIG. 1 for use in a joining strength evaluation test described below. Note that FIG. 1 and FIGS. 2 and 3 described below are schematic vertical views and the ratios of sizes and thicknesses of the respective members to the actually obtained joined bodies are not necessarily consistent with one another.

Figure 2:
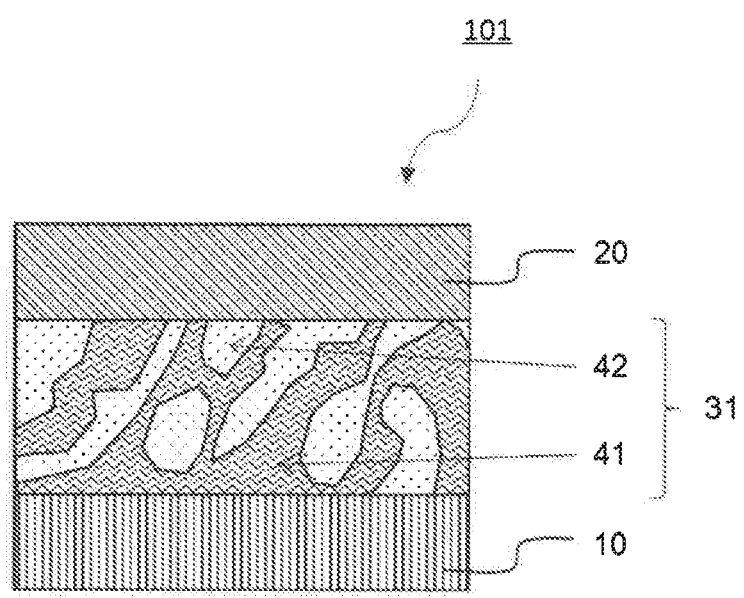
FIG. 2 is an enlarged schematic vertical cross-sectional view of a portion corresponding to a portion A indicated in FIG. 1, in the joined body obtained in Example 1.

FIG. 2 shows an enlarged schematic vertical cross-sectional view of a portion corresponding to the portion A indicated in FIG. 1, in the joined body 101 obtained in Example 1. As shown in FIG. 2, the resin composition 1 had a co-continuous phase including a continuous phase 41 (continuous phase A) formed of PA11 and a continuous phase 42 (continuous phase B) formed of PP. Moreover, the resin composition 1 had a microstructure in which in the continuous phase 41, a dispersed domain (dispersed domain a) formed of PP and a dispersed domain (dispersed domain a) formed of a reaction product of PA11 and m-EBR were dispersed (not shown); in the dispersed domain a formed of PP, a finely dispersed subdomain (finely dispersed subdomain a') formed of PA11 and a finely dispersed subdomain (finely dispersed subdomain a') formed of a reaction product of PA11 and m-EBR were dispersed (not shown); in the continuous phase B, a dispersed domain (dispersed domain b) formed of PA11 and a dispersed domain (dispersed domain b) formed of a reaction product of PA11 and m-EBR were dispersed (not shown); and in the dispersed domain b formed of the reaction product of PA11 and m-EBR, a finely dispersed subdomain (finely dispersed subdomain b') formed of PP and a finely dispersed subdomain (finely dispersed subdomain b') formed of m-EBR were dispersed (not shown).

Example 2

A joined body was obtained in the same manner as in Example 1 except that as the second joined member, a composite polypropylene plate ("Plastron" manufactured by Daicel Polymer Ltd.) formed of a filler-containing polypropylene (PP (GF 40 wt %)) containing polypropylene and 40% by mass of glass fiber relative to the total mass of the member was used.

Example 3

First, a resin composition 2 was obtained in the same manner as in the resin composition 1 of Example 1 except that polyamide 12 (PA12, "Rilsan A" manufactured by Arkema) was used in place of polyamide 11. Subsequently, a sheet 2 was fabricated in the same manner as in the sheet 1 of Example 1 except that the resin composition 2 was used in place of the resin composition 1. Subsequently, a joined body was obtained in the same manner as in Example 1 except that the sheet 2 was used in place of the sheet 1. The resin composition 2 had a co-continuous phase including a continuous phase A formed of PA12 and a continuous phase B formed of PP and also had a microstructure in which dispersed domains and finely dispersed subdomains were distributed in each continuous phase, like the resin composition 1.

Example 4

A joined body was obtained in the same manner as in Example 1 except that an aluminum plate formed of aluminum (A1050, mirror-finished, manufactured by Engineering Test Service) was used as the first joined member.

Example 5

A joined body was obtained in the same manner as in Example 1 except that an aluminum plate formed of aluminum (ADC12) was used as the first joined member.

Example 6

A joined body was obtained in the same manner as in Example 1 except that a steel plate formed of carbon steel (Fe (S45C)) was used as the first joined member.

Example 7

A joined body was obtained in the same manner as in Example 1 except that a copper plate formed of copper (Cu (C1020)) was used as the first joined member.

Example 8

A joined body was obtained in the same manner as in Example 1 except that a titanium plate formed of titanium (Ti (TP340)) was used as the first joined member.

Example 9

A joined body was obtained in the same manner as in Example 3 except that a steel plate formed of carbon steel (Fe (S45C)) was used as the first joined member.

Example 10

A joined body was obtained in the same manner as in Example 1 except that an aluminum plate formed of aluminum (A5052) was used as the second joined member.

Example 11

First, a mixed resin was obtained in the same manner as in Example 1 except that the mass ratio of PA11 and m-EBR (the mass of PA11:the mass of m-EBR) was changed to 25:20. Subsequently, a resin composition 3 was obtained in the same manner as in Example 1 except that the mass ratio of the obtained mixed resin and PP (the mass of the mixed resin:the mass of PP) became 45:55. Moreover, a sheet was fabricated in the same manner as in Example 1 except that the resin composition 3 was used in place of the resin composition 1, and was cut into a piece having a length of 5 mm×a width of 25 mm×a thickness of 500 µm as a sheet 3.

Subsequently, a joined body in which the first joined member (aluminum plate)/the joining layer (resin composition 1)/the sheet 3/the second joined member (polypropylene plate) were stacked in this order was obtained in the same manner as in Example 1 except that the sheet 1 was placed on an end of one surface of the aluminum plate and one surface of the sheet 3 was placed on a surface of the sheet 1 on the opposite side from the aluminum plate, which was placed on a hot plate and heated at 200° C. for 1 minute; thereafter, with the temperature being kept at 200° C., one surface of the polypropylene plate was placed on a surface of the sheet 3 on the opposite side from the aluminum plate and was pressed lightly for 30 seconds (pressurizing force: approximately 300 kPa) to be joined thereto.

Comparative Example 1

A sheet 4 was fabricated in the same manner as in the sheet 1 of Example 1 except that polyamide 11 (PA11, "Rilsan BMNO" manufactured by Arkema, weight average molecular weight: 18,000) was used as it was as a resin composition 4 in place of the resin composition 1. Subsequently, a joined body was obtained in the same manner as in Example 1 except that the sheet 4 was used in place of the sheet 1.

Comparative Example 2

Figure 3:
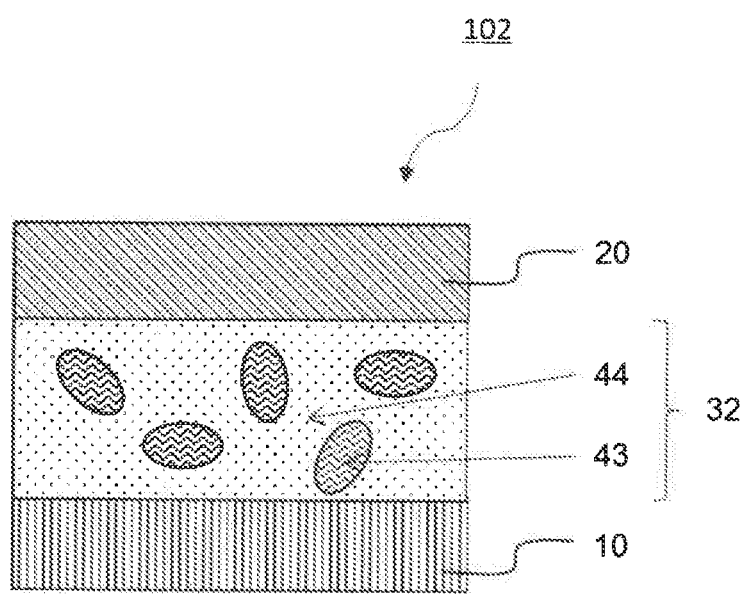
FIG. 3 is an enlarged schematic vertical cross-sectional view of a portion corresponding to the portion A indicated in FIG. 1, in the joined body obtained in Comparative Example 2.

A joined body 102 was obtained in the same manner as in Example 1 except that a sheet 3 fabricated in the same manner as in Example 11 was used in place of the sheet 1. FIG. 3 shows an enlarged schematic vertical cross-sectional view of a portion corresponding to the portion A indicated in FIG. 1, in the joined body 102 obtained in Comparative Example 2. As shown in FIG. 3, a resin composition 3 constituting a joining layer 32 had a structure (salami structure) which had a dispersed domain 43 formed of PA11 in a continuous phase 44 formed of PP and in which a finely dispersed subdomain formed of PP or a finely dispersed subdomain formed of a reaction product of PA11 and m-EBR (not shown) was distributed in the dispersed domain 43.

Table 1 below shows combinations of polyamide resins, polyolefin resins, and modified elastomers blended in the resin compositions 1 to 4 used in Examples and Comparative Examples and structures of the respective resin compositions.

TABLE 1

|  | Polyamide Resin | Polyolefin Resin | Modified Elastomer | Structure |
|---|---|---|---|---|
| Resin Composition 1 | PA11 | PP | m-EBR | Co-continuous Phase |
| Resin Composition 2 | PA12 | PP | m-EBR | Co-continuous Phase |
| Resin Composition 3 | PA11 | PP | m-EBR | Salami Structure |
| Resin Composition 4 | PA11 | — | — | Single Phase |

(Joining Strength Evaluation Test)

The joining strength of the joined body was evaluated for the joined body obtained in each of Examples and Comparative Examples Specifically, the opposite ends of each joined body (the end portion of the first joined member (10 in FIG. 1) (the end portion not in contact with the second joined member) and the end portion of the second joined member (20 in FIG. 1) (the end portion not in contact with the first joined member): the left end portion and the right end portion of the joined body 100 shown in FIG. 1) were pulled at a speed of 10 mm/min in the left and right directions of FIG. 1 by using a tensile testing device ("Instron Universal Testing System" manufactured by Instron Japan Co. Ltd.) to measure the tensile shear strength (unit: MPa) when the joined portions of the first joined member and the second joined member were peeled off each other. Then, an average value of tensile shear strengths of three joined bodies was obtained for each of Examples and Comparative Examples and the average value of the tensile shear strengths was used as the joining strength (unit: MPa).

Results of the joining strength evaluation test are shown in Table 2 below together with the combination of components constituting the first joined member, the second joined member, and the joining layer in each of Examples and Comparative Examples. Note that the polypropylene plate and the joining layer (resin composition 4) in Comparative Example 1 and the aluminum plate and the joining layer (resin composition 3) in Comparative Example 2 were peeled off after being left to be cooled, so that it was impossible to measure their joining strengths (indicated by "Peeled" in Table 2).

TABLE 2

|  | First Joined Member | Second Joined Member | Joining Layer | Bonding Strength [MPa] |
|---|---|---|---|---|
| Example 1 | Al (5052) | PP | Resin Composition 1 | 9.1 |
| Example 2 | Al (5052) | PP (GF 40 wt %) | Resin Composition 1 | 10.8 |
| Example 3 | Al (5052) | PP | Resin Composition 2 | 6.3 |

TABLE 2-continued

|  | First Joined Member | Second Joined Member | Joining Layer | Bonding Strength [MPa] |
|---|---|---|---|---|
| Example 4 | Al (1050, Mirror-Finished) | PP | Resin Composition 1 | 6.6 |
| Example 5 | Al (ADC12) | PP | Resin Composition 1 | 6.2 |
| Example 6 | Fe (S45C) | PP | Resin Composition 1 | 7.1 |
| Example 7 | Cu (C1020) | PP | Resin Composition 1 | 6.2 |
| Example 8 | Ti (TP340) | PP | Resin Composition 1 | 6.2 |
| Example 9 | Fe (S45C) | PP | Resin Composition 2 | 11.4 |
| Example 10 | Al (5052) | Al (5052) | Resin Composition 1 | 13.1 |
| Example 11 | Al (5052) | PP | Resin Composition 1 Resin Composition 3 | 8.3 |
| Comparative Example 1 | Al (5052) | PP | Resin Composition 4 | Peeled |
| Comparative Example 2 | Al (5052) | PP | Resin Composition 3 | Peeled |

As is clear from the results shown in Table 2, it was confirmed that the joined bodies (Examples 1 to 11) of the present invention in each of which the joining layer was formed of a resin composition having a co-continuous phase including a continuous phase A formed of a polyamide resin and a continuous phase B formed of a polyolefin resin and having a microstructure in which dispersed domains and finely dispersed subdomains were distributed in the continuous phases were capable of attaining excellent joining strengths with various metal members and resin members. On the other hand, it was confirmed that when the joining layer is of a single phase formed of a polyamide resin (Comparative Example 1) and when although being of a mixed phase, the joining layer does not have the co-continuous phase having the microstructure according to the present invention (Comparative Example 2), the joining layer and at least one of the metal member and the resin member were peeled off and joining was difficult.

As described above, according to the present invention, it is possible to provide a joined body in which joined members are each at least one of a metal member, a polyamide resin member, and a polyolefin resin member and which is excellent in joining strength between these joined members.

What is claimed is:
1. A joined body comprising:
a first joined member;
a second joined member; and
a first joining layer that joins the first joined member and the second joined member,
wherein the first joined member is a metal member and the second joined member is one selected from the group consisting of a metal member, a polyamide resin member, and a polyolefin resin member,
the first joining layer is a layer formed of a resin composition containing a polyamide resin, a polyolefin resin, a modified elastomer having a reactive group capable of reacting with the polyamide resin, and a reaction product of the polyamide resin and the modified elastomer,
the resin composition has a co-continuous phase including a continuous phase A formed of the polyamide resin and a continuous phase B formed of the polyolefin resin and has a dispersed domain a distributed in the continuous phase A, a finely dispersed subdomain a' distributed in the dispersed domain a, a dispersed domain b distributed in the continuous phase B, and a finely dispersed subdomain b' distributed in the dispersed domain b, the dispersed domain a is a dispersed domain formed of at least one selected from the group consisting of the polyolefin resin, and the reaction product of the polyamide resin and the modified elastomer,
the dispersed domain b is a dispersed domain formed of at least one selected from the group consisting of the polyamide resin, and the reaction product of the polyamide resin and the modified elastomer,
when the dispersed domain a is formed of the polyolefin resin, the finely dispersed subdomain a' is a finely dispersed subdomain formed of at least one selected from the group consisting of the polyamide resin, the modified elastomer, and the reaction product of the polyamide resin and the modified elastomer,
when the dispersed domain a is formed of the reaction product of the polyamide resin and the modified elastomer, the finely dispersed subdomain a' is a finely dispersed subdomain formed of at least one selected from the group consisting of the polyamide resin, the polyolefin resin, and the modified elastomer,
when the dispersed domain b is formed of the polyamide resin, the finely dispersed subdomain b' is a finely dispersed subdomain formed of at least one selected from the group consisting of the polyolefin resin, the modified elastomer, and the reaction product of the polyamide resin and the modified elastomer,
when the dispersed domain b is formed of the reaction product of the polyamide resin and the modified elastomer, the finely dispersed subdomain b' is a finely dispersed subdomain formed of at least one selected from the group consisting of the polyamide resin, the polyolefin resin, and the modified elastomer, and
an average thickness of the first joining layer is in a range of 300 to 700 μm.

2. The joined body according to claim 1, wherein a metal constituting at least one of the metal members is at least one selected from the group consisting of aluminum, iron, copper, and titanium.

3. The joined body according to claim 1, wherein
the second joined member is one selected from the group consisting of the polyamide resin member and the polyolefin resin member.

4. The joined body according to claim 1, wherein the polyamide resin blended in the resin composition contains at least one selected from the group consisting of polyamide 11, polyamide 12, polyamide 1010, and polyamide 1012.

5. The joined body according to claim 1, wherein the modified elastomer is a copolymer of ethylene or propylene and an α-olefin having 3 to 8 carbon atoms, the copolymer having an acid anhydride group as the reactive group.

6. The joined body according to claim 1, wherein the resin composition is a resin composition in which the dispersed domain a includes a dispersed domain formed of the polyolefin resin and a dispersed domain formed of the reaction product of the polyamide resin and the modified elastomer, the dispersed domain b includes a dispersed domain formed of the reaction product of the polyamide resin and the modified elastomer, the finely dispersed subdomain a' includes a finely dispersed subdomain which is present in the dispersed domain a formed of the polyolefin resin and which is formed of the reaction product of the polyamide resin and the modified elastomer, and the finely dispersed subdomain b' includes a finely dispersed subdomain which is present in the dispersed domain b formed of the reaction product of the polyamide resin and the modified elastomer and which is formed of the modified elastomer.

7. The joined body according to claim 1, wherein the first joined member and the second joined member are joined by the first joining layer by crimping while heating at a temperature in a range of 180 to 250° C.

8. The joined body according to claim 1, wherein an entirety of one surface of the first joined member and an entirety of one surface of the second joined member are joined by the first joining layer.

9. The joined body according to claim 1, wherein a portion of one surface of the first joined member and a portion of one surface of the second joined member are joined by the first joining layer.

10. The joined body according to claim 1, wherein a bonding strength of the first joining layer is in a range of 6.2 MPa to 13.1 MPa.

11. The joined body according to claim 1, wherein the polyolefin resin is at least one of a polyethylene resin and a polypropylene resin.

* * * * *